United States Patent [19]

Orquera et al.

[11] Patent Number: 4,878,416
[45] Date of Patent: Nov. 7, 1989

[54] SUSPENSION SYSTEM FOR CYLINDRICAL ELEMENTS IN CONTAINERS

[75] Inventors: Henri Orquera, La Seyne Sur Mer; Gérard Jennequin, Six Fours, both of France

[73] Assignee: Constructions Industrielles de la Mediterranee, Paris, France

[21] Appl. No.: 214,224

[22] Filed: Jul. 1, 1988

[30] Foreign Application Priority Data

Aug. 4, 1987 [FR] France .................. 87 11046

[51] Int. Cl.[4] ............................. F41F 3/04
[52] U.S. Cl. .................... 89/1.810; 89/1.816
[58] Field of Search .......... 89/1.809, 1.810, 1.816, 89/1.8

[56] References Cited

U.S. PATENT DOCUMENTS

| | | | |
|---|---|---|---|
| 3,072,022 | 1/1963 | Wood et al. | 89/1.810 |
| 3,221,602 | 12/1965 | Price et al. | 89/1.810 |
| 3,289,533 | 12/1966 | Brown | 89/1.810 |
| 3,368,452 | 2/1968 | Fredrickson et al. | 89/1.816 |
| 3,392,629 | 7/1968 | Soderberg | 89/1.816 |
| 4,492,143 | 1/1985 | Ruhle | 89/1.816 |
| 4,604,940 | 8/1986 | Mendelsohn et al. | 89/1.816 |
| 4,646,617 | 3/1987 | Robinson | 89/1.810 |
| 4,665,792 | 5/1987 | Gassler et al. | 89/1.816 |
| 4,734,329 | 3/1988 | Rudd et al. | 89/1.816 |

*Primary Examiner*—David H. Brown
*Attorney, Agent, or Firm*—Pollock, Vande Sande & Priddy

[57] ABSTRACT

A shock-absorbing system for supporting cylindrical elements in housings or containers having a generally cylindrical shape ensures their protection against shocks and vibrations, while maintaining a large clearance between the cylindrical element and its housing. The system comprises a plurality of unitary springs formed of curved deflection/torsion bars, which are disposed on the periphery of a cylinder whose upper portion is connected to the supported element and whose lower portion is connected to the container or housing receiving the element to be supported.

12 Claims, 4 Drawing Sheets

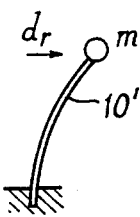
Fig.1a
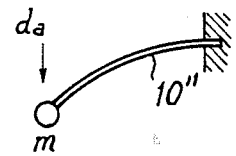
Fig.1b
Fig.1c 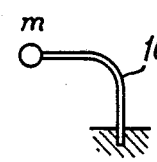 Fig.1d 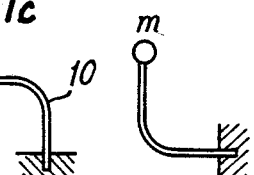 Fig.1e 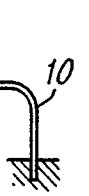 Fig.1f  Fig.1g 
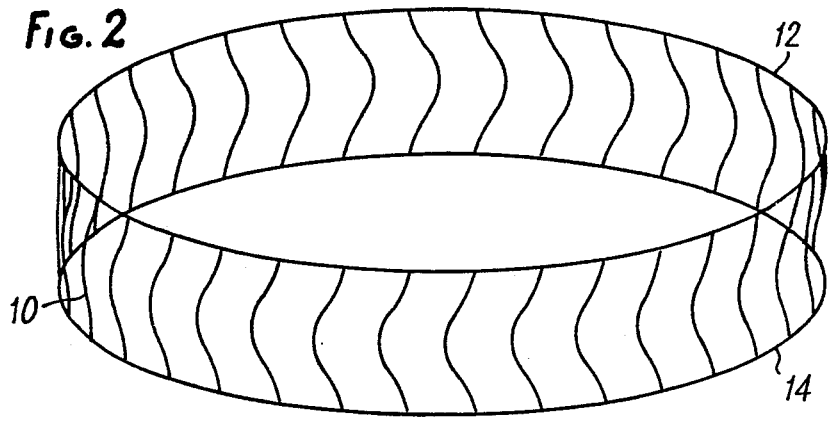
Fig.2
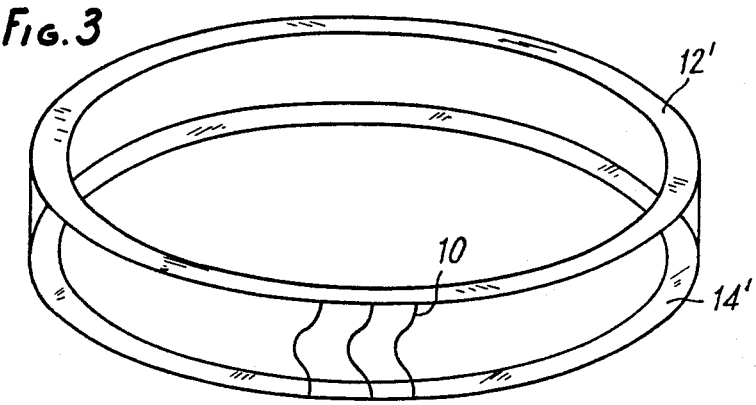
Fig.3

SUSPENSION SYSTEM FOR CYLINDRICAL ELEMENTS IN CONTAINERS

FIELD OF THE INVENTION

The present invention relates to a suspension system of elements, preferably cylindrical, in containers having preferably a generally cylindrical shape, and particularly to the suspension of missiles used aboard missile-launcher submarines, for ensuring their protection against shocks and/or vibrations while maintaining a large clearance between the missile and its launching tube, hence a reduced space requirement. This system is designed such as allow a displacement in all directions and is optimized for to obtaining the desired rigidity in each direction.

It is known that the missiles which are used aboard missile-launcher submarines are in the shape of a substantially cylindrical body accommodated within a container, which is in turn accommodated within a launching tube rigidly connected to the submarine and having also a cylindrical shape, the volume of which is larger than that of the missile-container system so as to ensure a relatively important clearance of the missile-container system with respect to its launching tube. One is therefore led to foresee a flexible suspension system interposd between the two cylinders (missile-container and launching tube) allowing supporting the of mass of the missile on the submarine structure.

At present, the suspensions used in the missile-launcher submarines are made with standard damping systems such as standard springs, for example helical springs or blocks of elastomers and hydraulic dampers. These known systems have, on the one hand, the disadvantage of reducing the possible clearance between the missile and its housing and, on the other hand, require a relatively large space for positioning the suspension system.

SUMMARY OF THE INVENTION

The present invention aims at remedying the disadvantages of the known systems by adjusting in the best manner the geometrical space requirement of the suspension system to the annular space which is available between each missile and its housing.

The suspension system which is the object of the present invention is characterized in that it is made of a sheet of unitary springs formed of curved deflection/torsion bars, which are disposed on the periphery of a cylinder, the upper portion of the cylinder being connected to the suspension system, that is the missile, while the lower portion is connected to the missile housing, that is to the cylindrical tube which is rigidly connected to the submarine.

Due to these characteristics, the suspension system constitutes a multi-spring assembly, of generally cylindrical configuration, interposed between the missile and its housing, which exhibits the desired characteristics meeting the hereabove mentioned objective regarding an optimum adjustment of the space requirement of the suspension system as a function of the annular space available between the missile and its housing and allowing also a displacement in all directions, while obtaining the desired rigidity in each direction.

In order to have a better understanding of the principles on which the suspension system which is the object of the present invention is based, reference is made to FIGS. 1a to 1g which show embodiments of a unitary spring used in the suspension system according to the present invention.

Each one of the unitry springs 10 is made of a bar working in deflection/torsion, supporting a portion m of the mass of the missile. As may be seen in the figures, the bars are curved so as to present:

(a) one or several portions 10', FIG. 1a, absorbing the radial (horizontal) displacement shown schematically by arrow dr, and (b) one or several portions 10'' absorbing the axial (vertical) displacements shown schematically by arrow da.

FIG. 1c to 1g illustrate a number of examples of the shapes of the unitary springs allowing obtaining this double effect (radial displacement and axial displacement).

According to the present invention, the unitary springs are made preferably of metal, or of a composite material such as glass fibers/epoxy resin. Their section can be of any type, round, square of rectangular, and their curvature as well as their slenderness are adapted to obtain the stiffness characteristics required in each direction of the displacements.

BRIEF DESCRIPTION OF THE DRAWINGS

Other features and advantages of the present invention will become more apparent from the hereafter description, with reference to the accompanying drawings illustrating various embodments thereof, without any limiting character. In the drawings:

FIG. 1a and 1b are the hereabove discussed sketches explaining the principles on which the invention is based;

FIGS. 1c to 1g are sketches showing various embodiments of the shapes of the unitary springs used in the suspension system according to the present invention;

FIG. 2 is a perspective schematic view showing the sheet of springs of the suspension system according to the invention;

FIG. 3 is a perspective view showing in a schematic way the suspension system of the present invention;

DETAILED DESCRIPTION OF THE PREFERRED EMBODIMENT(S)

Figure 4:
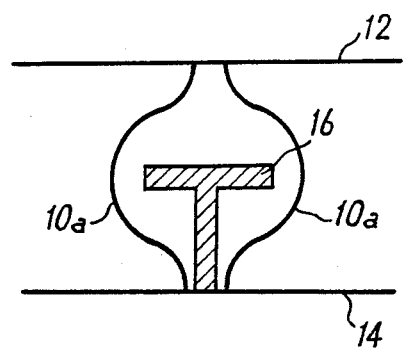
FIGS. 4 and 5 are schematic views showing various embodiments of the unitary springs used in the suspension system of this invention, the shapes being chosen as a function of the installation constraints.

Reference being first made to FIGS. 2 and 3, one sees that the suspension system which is the object of the present invention includes substantially a sheet of or generally cylindrical shape, made of elementary springs 10 whose possible shapes are illustrated in FIGS. 1c to 1g. As may be seen in the drawing, the general shape is plane and slightly curved so as to distribute all the elementary springs 10 on the surface of a cylinder (or of a cone). The circular upper portion 12 of the sheet thus constituted is connected to the suspended system (that is the missile in this example of application) and the circular lower portion 14 of the sheet of springs is connected to the housing of the element to be suspended (that is to the missile launching tube in the case of application in consideration, this tube being connected to the submarine structure). As shown in FIG. 3 the sheet of elementary springs is maintained between two circular crowns 12' and 14', the crown 12' being conncted to the suspended system (missile) while the lower crown 14' is connected to the submarine through the launching tube.

A damping system is obtained having the total space requirement of a cylinder or of a cone, of small thickness, limited by two crowns 12' and 14'. The assembly thus provided allows obtaining a relative displacement of the two crowns in all the directions, which allows ensuring the anti-shock and/or vibratory suspension function while allowing a large clearance within a reduced space.

The unitary springs 10 may be disposed such as to form passages, for structure elements of the submarine.

Figure 5:
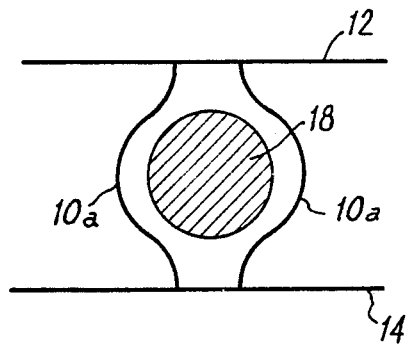

In FIG. 4 is shown a shape of curved springs 10a allowing the passage of a hull reinforcement element 16, and in FIG. 5, this same shape of curved springs 10a allows the passage of a tubing 18.

Figure 6:
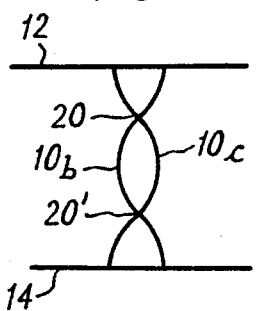
FIGS. 6 and 7 are schematic views of unitary springs with means for obtaining the desired damping effect for the suspension system.
Figure 7:
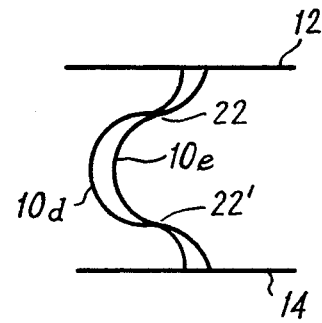

In order to improve the desired damping effect, one can provide dry or viscous rubbing of the springs 10 on themselves and/or on a material interposed between the springs. Thus, FIG. 6 illustrates an embodiment using two sheets of crossed springs 10c, 10b rubbing onto each other at points 20, 20', FIG. 7 shows an embodiment, in which the desired dampng effect is obtained by using two parallel sheets of springs 10d, 10e rubbing onto each other at points 22, 22'.

Figure 7A:
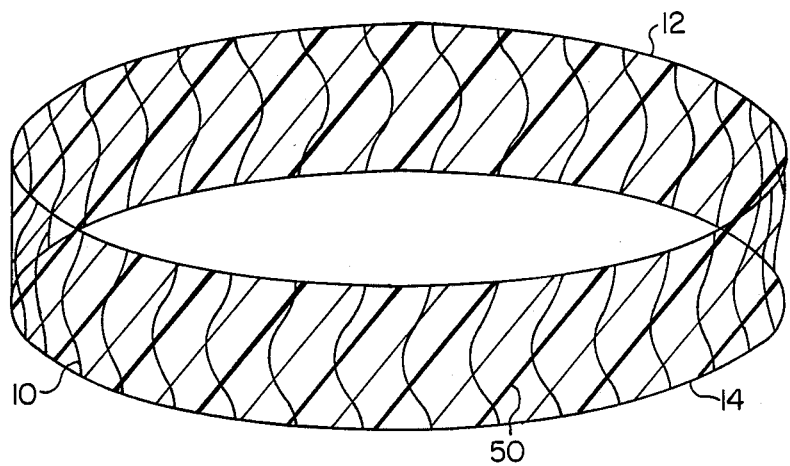
FIG. 7a shows another embodiment of the present invention.

According to another embodiment of this invention, shown in FIG. 7a, for obtaining the tightness of the cylindrical damping system thus provided, one can embed the sheet of springs in a material 50 which is preferably of the elastomeric type.

Figure 8:
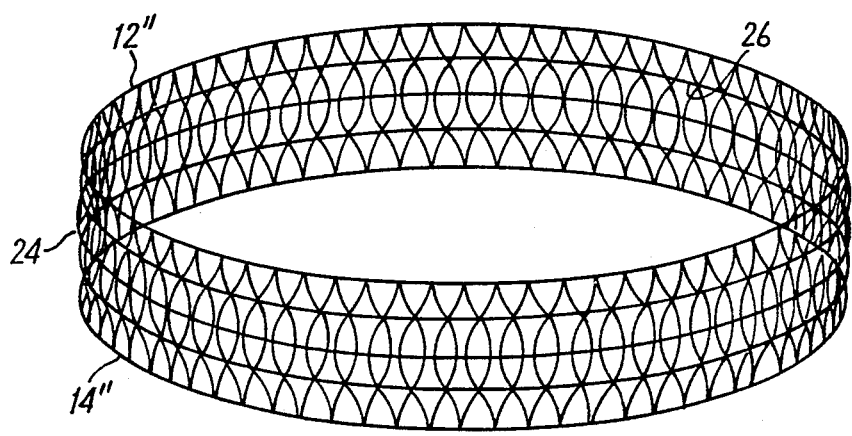
FIG. 8 is a perspective view of still another embodiment of a sheet of springs used for providing the suspension system according to this invention.

FIG. 8 illustrates another embodiment of a damping system according to the invention, including as hereabove described a sheet of springs generally designated by reference numeral 24, interposed between two crowns 12", 14" similar to crowns 12' and 14' (FIGS. 2 and 3), the resistance to pressure in this embodiment being obtained by a winding of circular member such as 26 on the sheet of springs 24, prior to embedding the latter in an elastomeric material.

Figure 9:
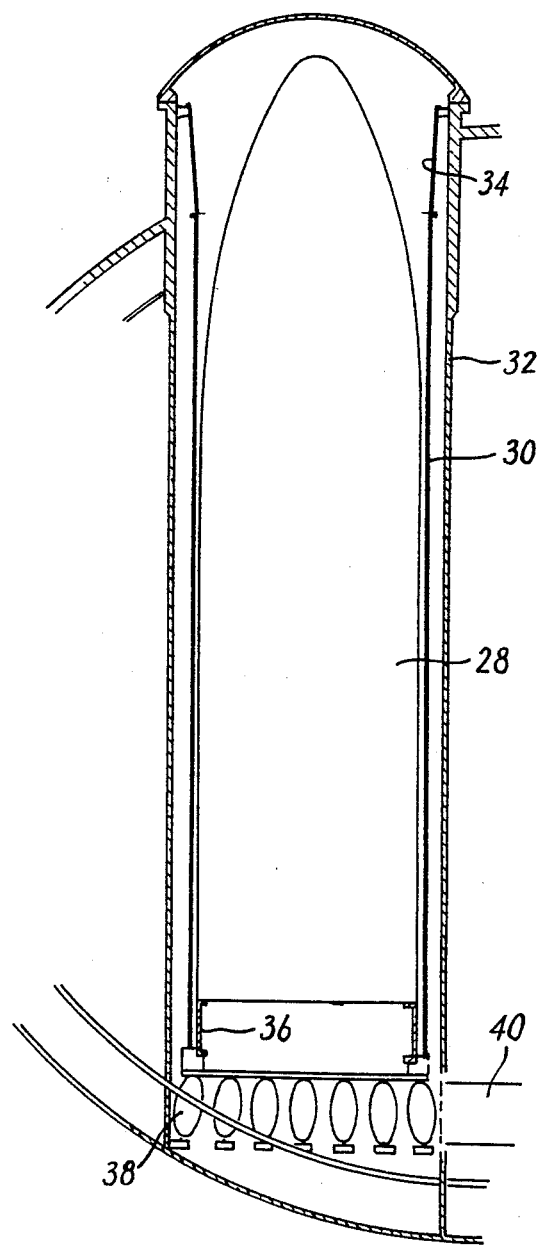
FIG. 9 shows by way of a non-limiting example how the suspension system of the present invention is put in operation for providing the suspension of a missile in its housing aboard a missile-launcher submarine.

Reference is now made to FIG. 9 which is a sectional schematic view in a vertical plane which shows an example of application of the system according to the invention to the suspension of a missile in the launching tube of a missile-launcher submarine.

In this FIG. 9, one sees at 28 the missile in its container 30, the missile 28 and container 30 assembly being accommodated as known in the launching tube 32. The missile is launched from the submarine by compressed air and there is shown at 40 the feeding tubing.

According to this example of application of the invention, the missile 28 and its container 30 are suspended in the launching tube 32:

(1) at the upper portion of tube 32 by using a suspension system 34 according to the invention conforming to any one of the embodiments hereabove described, the upper crown of this suspension system 34 being connected to the launching tube 32 (that is to the submarine) while the lower crown of this suspension system 34 is connected to the missile plus container assembly 30;

(2) at the lower portion of tube 32 by using a suspension system 36 according to the invention, with the lower crown joined to the container tube 32 and the upper crown joined to the missile 28;

(3) at the lower portion of tube 32 by using a suspension system 38 according to the invention, with the upper crown joined to the container tube 32 and the lower portion joined to the submarine hull, while providing passages notably for the hull reinforcement elements.

Obviously, the present invention is not limited to the embodiments or examples of application described and mentioned here and it encompasses all the variants thereof.

We claim:

1. A shock-absorbing system for supporting a cylindrical element in a substantially cylindrical housing, comprising:
a multi-spring assembly of a substantially cylindrical configuration including a lower edge member, an upper edge member and a plurality of unitary resilient bars, each forming a spring extending therebetween, said upper edge member being connected to the supported cylindrical element and said lower edge member being connected to the housing, wherein each resilient bar is shaped to have portions which form a means for absorbing multidirectional displacements between the cylindrical element and the housing.

2. A shock-absorbing system according to claim 1, wherein said resilient bars are made of metal.

3. A shock-absorbing system according to claim 1, wherein said resilient bars are spaced apart to provide a free passage therebetween.

4. A shock-absorbing system according to claim 1, wherein said resilient bars are embedded in an elastomeric material.

5. A shock-absorbing system according to claim 1, wherein at least some of said springs are interposed to have portions being in frictional contact with each other.

6. A shock-absorbing system according to claim 1, wherein said resilient bars include at least one portion for absorbing a horizontal displacement and at least one portion for absorbing a vertical displacement.

7. A shock-absorbing system according to claim 6, wherein said resilient bars have a curved shape.

8. A shock-absorbing system according to claim 1, wherein said resilient bars are made of a composite material.

9. A shock-absorbing system according to claim 8, wherein said composite material comprises glass fibers/epoxy resin.

10. A shock-absorbing system according to claim 1, further comprising at least one ring provided over said multi-spring assembly between said lower and upper edge members.

11. A shock-absorbing system according to claim 10, wherein said multi-spring assembly with said ring are embedded in an elastomeric material.

12. A shock-absorbing system used for supporting of a container with a missile in the launching tube of a missile-launcher submarine, comprising:
a first, second and third shock-absorbing assembly, each including an upper and a lower crown and a plurality of unitary springs extending therebetween, each spring comprising a resilient bar being shaped to form a means for absorbing multi-directional displacements between the missile and the launching tube, wherein, said first assembly has its upper crown connected to the launching tube and its lower crown connected to the container;

said second assembly has its upper crown connected to the missile and its lower crown connected to the container, and wherein;

said third assembly has its upper crown connected to the container and its lower portion connected to the submarine hull.

* * * * *

UNITED STATES PATENT AND TRADEMARK OFFICE
CERTIFICATE OF CORRECTION

PATENT NO. : 4,878,416

DATED : November 7, 1989

INVENTOR(S) : Henri Orquera, et al.

It is certified that error appears in the above-identified patent and that said Letters Patent is hereby corrected as shown below:

Column 1, line 14, after "as" and before "allow" insert --to--;

line 15, delete "to";

line 28, change "the of mass of the" to --the mass of the--.

Column 2, line 13, change "FIG." to --FIGS.--;

line 20, change "of" to --or--;

line 28, change "embodments" to --embodiments--;

line 30, change "FIG." to --FIGS.--;

line 54, change "a non limiting" to --an--;

line 63, after "of" delete "or".

UNITED STATES PATENT AND TRADEMARK OFFICE
CERTIFICATE OF CORRECTION

PATENT NO. : 4,878,416

DATED : November 7, 1989

INVENTOR(S) : Henri Orquera, et al

It is certified that error appears in the above-identified patent and that said Letters Patent is hereby corrected as shown below:

Column 3, line 10, change "conncted" to --connected--;

line 33, change "dampng" to --damping--;

line 47, change "member" to --members--.

Signed and Sealed this

Eighth Day of January, 1991

Attest:

Attesting Officer

HARRY F. MANBECK, JR.

Commissioner of Patents and Trademarks